US012449130B2

(12) United States Patent
Nishiumi et al.

(10) Patent No.: US 12,449,130 B2
(45) Date of Patent: Oct. 21, 2025

(54) COMBUSTOR AND GAS TURBINE

(71) Applicant: MITSUBISHI HEAVY INDUSTRIES, LTD., Tokyo (JP)

(72) Inventors: Takashi Nishiumi, Tokyo (JP); Yusuke Takami, Tokyo (JP); Akinori Ichikawa, Tokyo (JP); Norihiko Motoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/727,224

(22) PCT Filed: Jan. 13, 2023

(86) PCT No.: PCT/JP2023/000711
§ 371 (c)(1),
(2) Date: Jul. 8, 2024

(87) PCT Pub. No.: WO2023/140180
PCT Pub. Date: Jul. 27, 2023

(65) Prior Publication Data
US 2025/0093033 A1 Mar. 20, 2025

(30) Foreign Application Priority Data
Jan. 21, 2022 (JP) ................................ 2022-007824

(51) Int. Cl.
*F23R 3/00* (2006.01)
*F23R 3/28* (2006.01)

(52) U.S. Cl.
CPC .............. *F23R 3/286* (2013.01); *F23R 3/283* (2013.01); *F05D 2240/35* (2013.01)

(58) Field of Classification Search
CPC ................................ F23R 3/286; F23R 3/283
See application file for complete search history.

(56) References Cited

U.S. PATENT DOCUMENTS 11,480,339 B2 10/2022 Taniguchi et al.
2012/0180490 A1 7/2012 Takami et al.
(Continued)

FOREIGN PATENT DOCUMENTS

JP 3034859 4/2000
JP 2005-195284 7/2005
(Continued)

OTHER PUBLICATIONS

International Search Report issued Feb. 14, 2023 in International Application No. PCT/JP2023/000711, with English translation of search report.
(Continued)

*Primary Examiner* — Katheryn A Malatek
(74) *Attorney, Agent, or Firm* — Wenderoth, Lind & Ponack, L.L.P.

(57) ABSTRACT

A combustor that causes compressed air supplied from a compressor to combust together with fuel. The combustor includes at least one fuel nozzle having a fuel flow path for supplying fuel and a purge air flow path for ejecting purge air. The combustor further includes a nozzle-securing part for securing at least one fuel nozzle; and a top hat body located on the outer peripheral side of at least part of the nozzle-securing part. The top hat body has a first internal flow path capable of supplying compressed air to the nozzle-securing part from a space on the outer peripheral side of the top hat body. The nozzle-securing part has a second internal flow path capable of supplying compressed air supplied from the first internal flow path to the purge air flow path of the fuel nozzle.

19 Claims, 9 Drawing Sheets

(56) References Cited

U.S. PATENT DOCUMENTS

| | | | | |
|---|---|---|---|---|
| 2018/0209651 | A1* | 7/2018 | Cai | F23R 3/346 |
| 2019/0032919 | A1 | 1/2019 | Okada et al. | |
| 2020/0340674 | A1 | 10/2020 | Inoue et al. | |

FOREIGN PATENT DOCUMENTS

| | | |
|---|---|---|
| JP | 2012-145077 | 8/2012 |
| JP | 2017-187186 | 10/2017 |
| JP | 2019-82263 | 5/2019 |
| JP | 6546334 | 7/2019 |

OTHER PUBLICATIONS

International Preliminary Report on Patentability issued Aug. 2, 2024 in International Application No. PCT/JP2023/000711, with English translation.

* cited by examiner

A-A

C-C

F-F

COMBUSTOR AND GAS TURBINE

TECHNICAL FIELD

The present disclosure relates to a combustor and a gas turbine.

The present application claims priority based on Japanese Patent Application No. 2022-007824 filed in Japan on Jan. 21, 2022, the contents of which are incorporated herein by reference.

BACKGROUND ART

A combustor used in a gas turbine mainly includes a cylinder body through which combustion gas flows, a plurality of nozzles that form a flame in the cylinder body, and a plurality of swirling blades provided around the nozzles. A high-temperature and high-pressure combustion gas is generated in the cylinder body by the flame formed by the nozzle. Inside the combustor, a phenomenon called flashback may occur in a process in which fuel and air flow. Flashback is a phenomenon in which abnormal combustion occurs because the flame propagates to an unexpected region in the combustor. In particular, in a central region (vortex core) of a swirling flow formed by the above-described swirling blade, a flow speed and pressure are lower than those in other regions. Therefore, it is known that flashback is likely to occur. In order to avoid such flashback, for example, in the device in PTL 1 described below, an air flow path for supplying air from a tip of the nozzle to the vortex core is formed, so that a flow speed of a fluid in the vortex core is increased. Air is guided to the air flow path from a position on an upstream side of the nozzle with respect to the swirling blade (pressure loss part). In this manner, it is considered that flashback can be avoided.

CITATION LIST

Patent Literature

[PTL 1] Japanese Unexamined Patent Application Publication No. 2019-082263

SUMMARY OF INVENTION

Technical Problem

The above-described PTL 1 discloses a configuration in which a part of casing air is taken into a fuel nozzle as purge air via a casing external pipe. However, in the gas turbine combustor described in PTL 1, there is a problem in that a heat loss occurs because the casing air passes through the casing external pipe.

In view of the above-described circumstances, an object of at least one embodiment of the present disclosure is to provide a combustor and a gas turbine capable of suppressing a heat loss in the gas turbine.

Solution to Problem (1) A combustor according to at least one embodiment of the present disclosure is a combustor that combusts compressed air supplied from a compressor together with fuel, the combustor including: at least one fuel nozzle that has a fuel flow path for supplying the fuel and a purge air flow path for jetting purge air; a nozzle fixing part for fixing the at least one fuel nozzle; and a top hat body that is disposed on an outer peripheral side of at least a part of the nozzle fixing part, in which the top hat body has a first internal flow path through which the compressed air is supplied from a space on the outer peripheral side to the nozzle fixing part, and the nozzle fixing part has a second internal flow path through which the compressed air supplied from the first internal flow path is supplied to the purge air flow path of the fuel nozzle.

(2) A gas turbine according to at least one embodiment of the present disclosure includes the compressor; the combustor having the above-described configuration of (1); and a turbine configured to be driven by combustion gas from the combustor.

Advantageous Effects of Invention

According to at least one embodiment of the present disclosure, it is possible to suppress a heat loss in a gas turbine.

DESCRIPTION OF EMBODIMENTS

Figure 1:
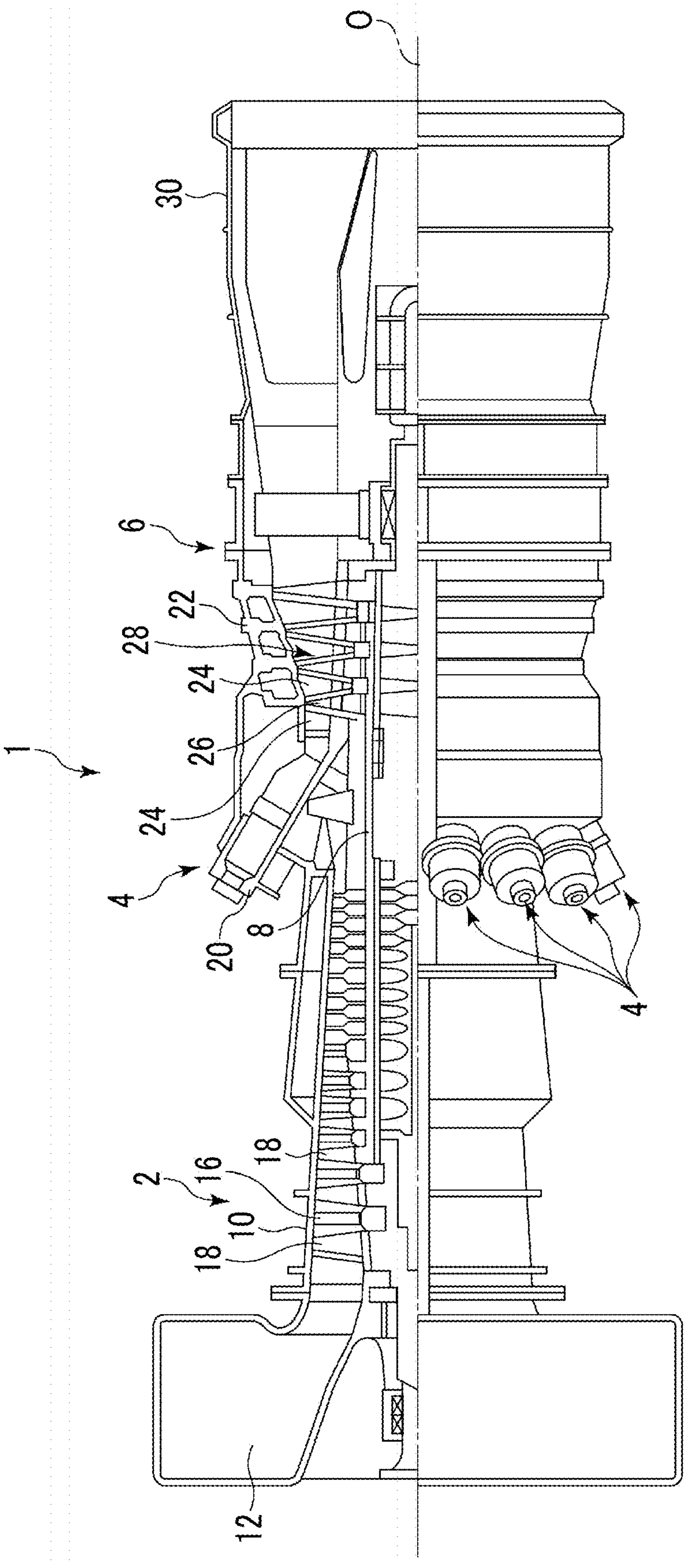
FIG. 1 is a schematic configuration diagram of a gas turbine according to some embodiments.

Hereinafter, some embodiments of the present disclosure will be described with reference to the accompanying drawings. However, dimensions, materials, shapes, and relative dispositions of components described as the embodiments or shown in the drawings are not intended to limit the scope of the present disclosure, and are merely examples for describing the present disclosure.

For example, expressions representing relative or absolute dispositions such as “in a certain direction”, “along a certain direction”, “parallel”, “orthogonal”, “center”, “concentric”, or “coaxial” not only strictly represent the dispositions, but also represent a state where the dispositions are relatively displaced with a tolerance or at an angle or a distance to such an extent that the same function can be obtained.

For example, expressions representing that things are in an equal state such as “same”, “equal”, and “homogeneous” not only strictly represent an equal state, but also represent a state where a difference exists with a tolerance or to such an extent that the same function can be obtained.

For example, expressions representing shapes such as a quadrangular shape and a cylindrical shape not only represent shapes such as a quadrangular shape and a cylindrical shape in a geometrically strict sense, but also represent shapes including an uneven part or a chamfered part within a range where the same effect can be obtained.

In addition, expressions of "being provided with", "being equipped with", "including", or "having" one component are not exclusive expressions excluding the presence of other components.

First, a gas turbine, which is an example of an application target of a combustor according to some embodiments, will be described with reference to FIG. 1. FIG. 1 is a schematic configuration diagram of a gas turbine according to some embodiments.

As shown in FIG. 1, a gas turbine 1 includes a compressor 2 for generating compressed air, a combustor 4 for generating combustion gas using the compressed air and fuel, and a turbine 6 configured to be rotationally driven by the combustion gas. In a case of the gas turbine 1 for power generation, a generator (not shown) is connected to the turbine 6.

The compressor 2 includes a plurality of stator vanes 16 fixed to a side of a compressor casing 10, and a plurality of rotor vanes 18 embedded in a rotor 8 to be alternately arranged with respect to the stator vanes 16.

Air taken in from an air intake port 12 is sent to the compressor 2, and the air passes through the plurality of stator vanes 16 and the plurality of rotor vanes 18 and is compressed to: be high-temperature and high-pressure compressed air.

The fuel and the compressed air generated by the compressor 2 are supplied to the combustor 4, and the fuel is combusted in the combustor 4. Thereby, combustion gas serving as a working fluid of the turbine 6 is generated. As shown in FIG. 1, the gas turbine 1 includes a plurality of combustors 4 disposed along the circumferential direction with the rotor 8 in a casing 20 as a center.

The turbine 6 includes a combustion gas passage 28 formed by a turbine casing 22, and includes a plurality of stator vanes 24 and a plurality of rotor vanes 26 provided in the combustion gas passage 28. The stator vanes 24 and the rotor vanes 26 of the turbine 6 are provided on a downstream side of the combustor 4 with respect to a flow of the combustion gas.

The stator vane 24 is fixed to a side of the turbine casing 22, and a stator vane row is configured with the plurality of vanes arranged along the stator 24 circumferential direction of the rotor 8. Further, the rotor vanes 26 are embedded on the rotor 8, and a rotor vane row is configured with the plurality of rotor vanes 26 arranged along the circumferential direction of the rotor 8. The stator vane row and the rotor vane row are alternately arranged in an axial direction of the rotor 8.

In the turbine 6, the combustion gas from the combustor 4 that is flowed into the combustion gas passage 28 passes through the plurality of stator vanes 24 and the plurality of rotor vanes 26, so that the rotor 8 is rotationally driven around an axis line O. As a result, a generator connected to the rotor 8 is driven to generate power. After driving the turbine 6, the combustion gas is discharged to an outside via an exhaust chamber 30.

Next, the combustor 4 according to some embodiments will be described.

Figure 2:
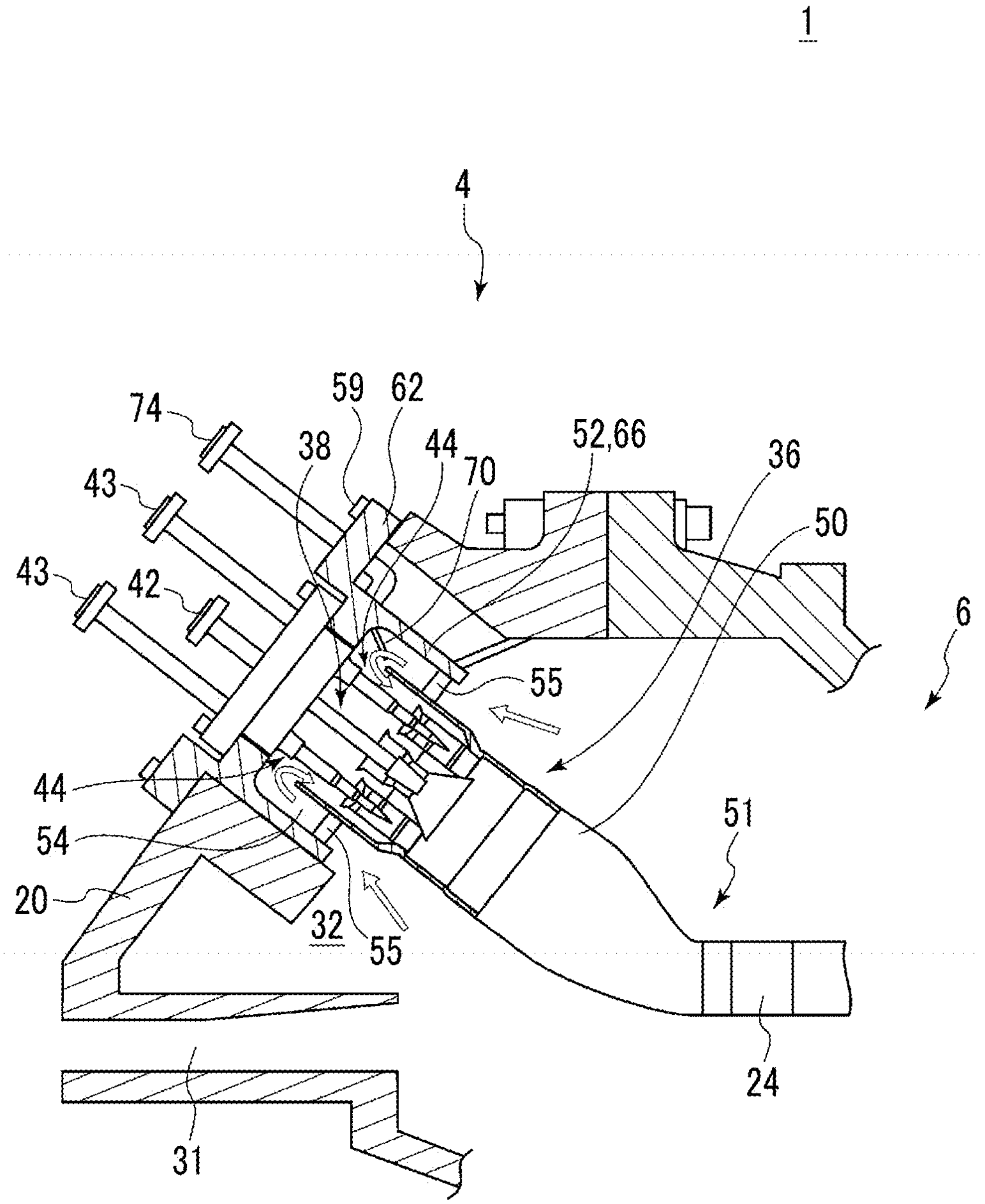
FIG. 2 is a schematic diagram showing a combustor and an inlet portion of a turbine of the gas turbine according to some embodiments.

FIG. 2 is a schematic diagram showing inlet portions of the combustor 4 and the turbine 6 of the gas turbine 1 according to some embodiments.

Figure 3A:
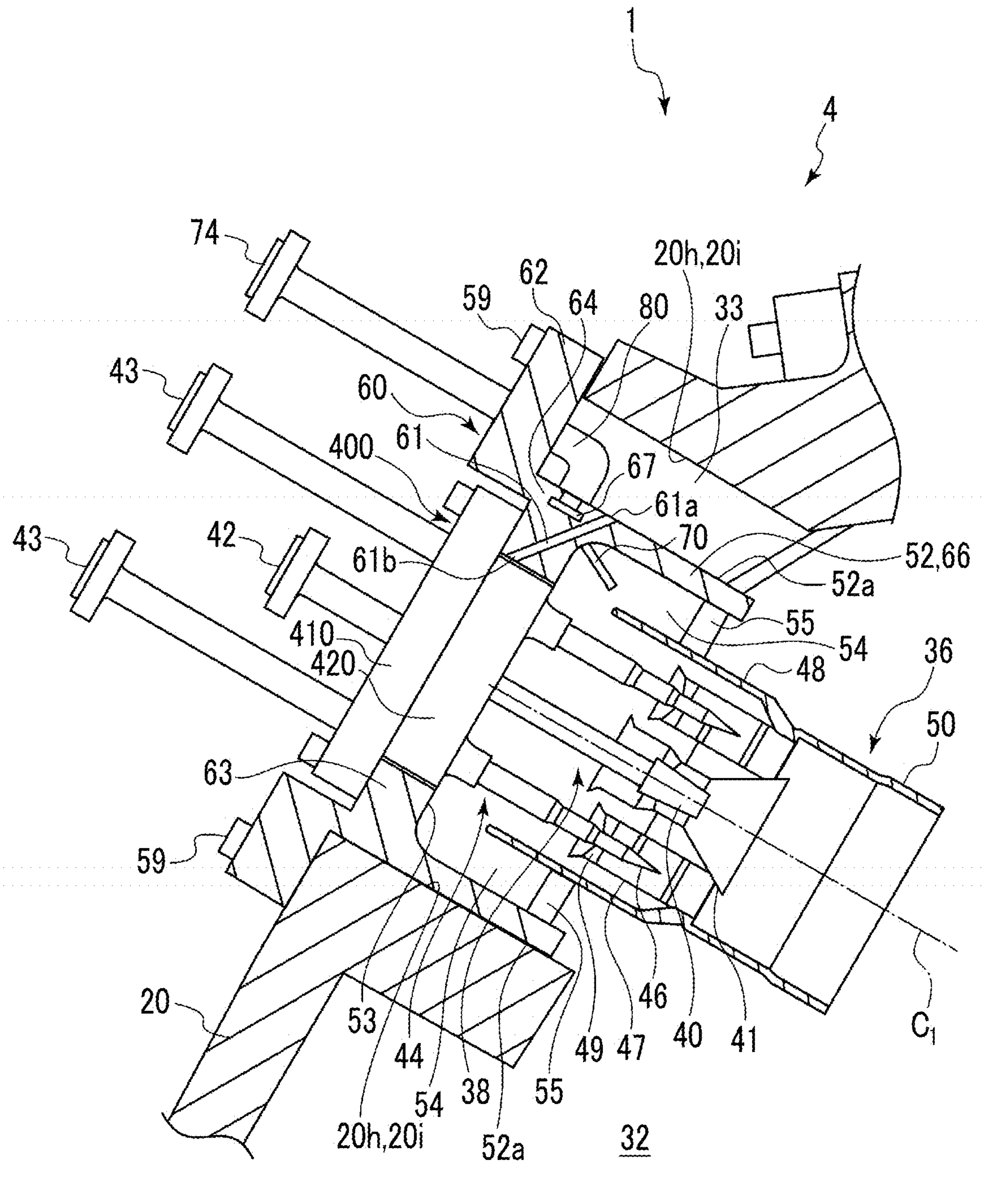
FIG. 3A is a schematic cross-sectional diagram of a combustor of a gas turbine according to one embodiment.

FIG. 3A is a schematic cross-sectional diagram of the combustor 4 of the gas turbine 1 according to one embodiment.

Figure 3B:
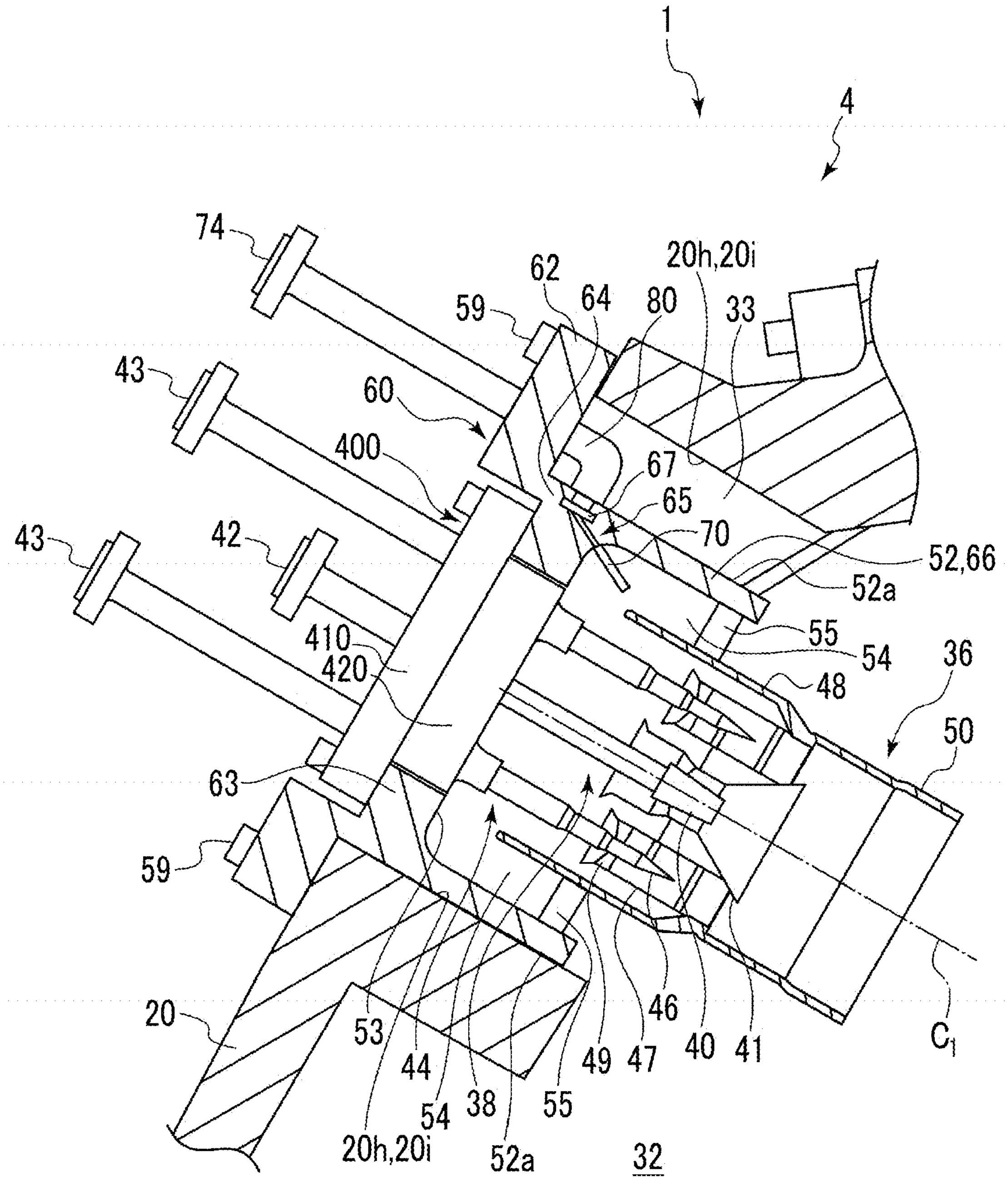
FIG. 3B is a schematic cross-sectional diagram of the combustor of the gas turbine according to one embodiment.

FIG. 3B is a schematic cross-sectional diagram of the combustor 4 of the gas turbine 1 according to one embodiment, and shows a cross section in which a position of the combustor in the circumferential direction (hereinafter, simply referred to as "circumferential direction") is different from that in FIG. 3A.

Figure 4:
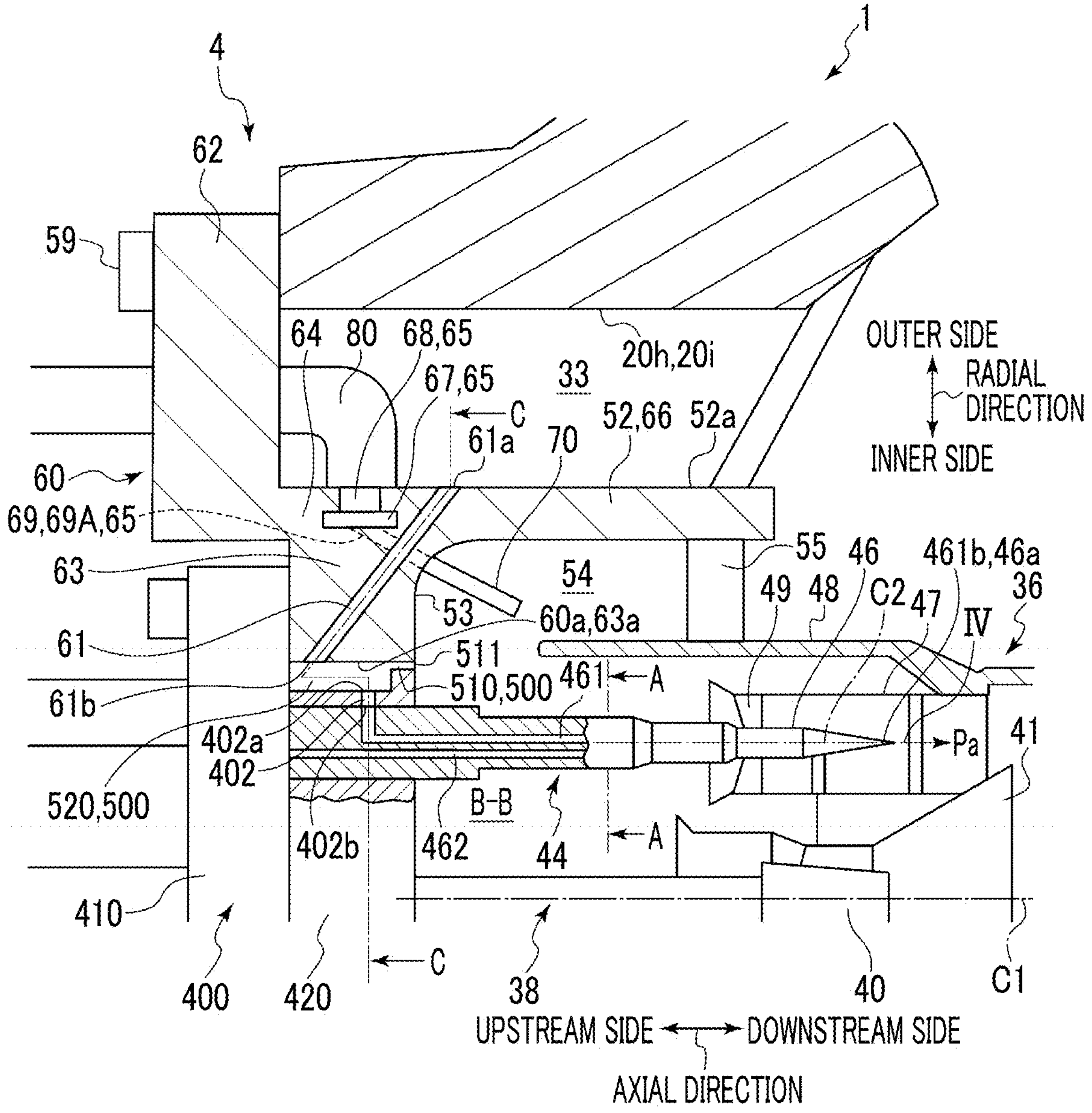
FIG. 4 is a schematic cross-sectional diagram of a main part of the combustor of the gas turbine according to one embodiment.
Figure 4:
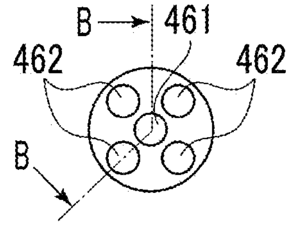

FIG. 4 is a schematic cross-sectional diagram of a main part of the combustor 4 of the gas turbine 1 according to one embodiment.

Figure 5:
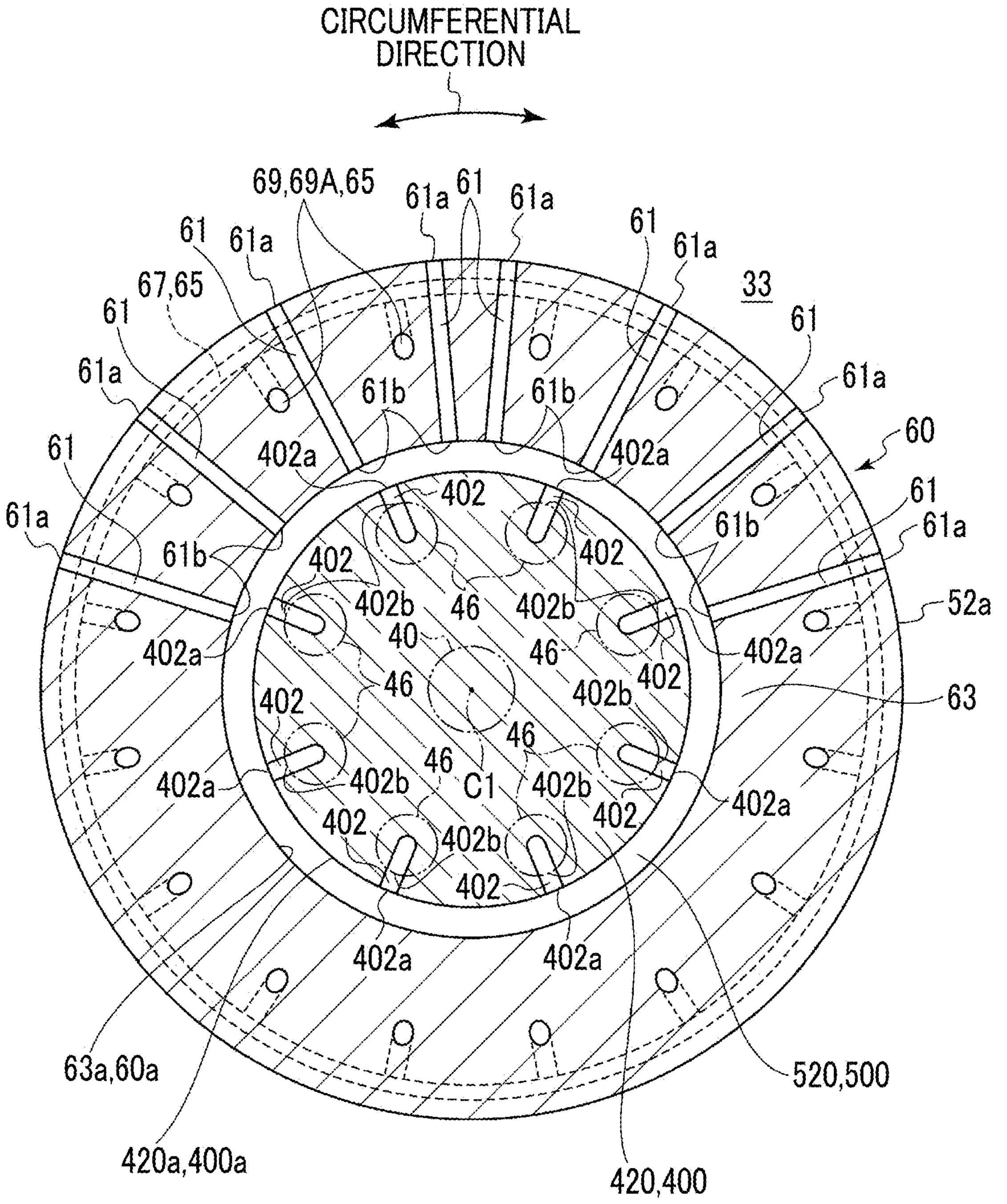
FIG. 5 is a schematic cross-sectional diagram taken along line C-C of FIG. 4.

FIG. 5 is a schematic cross-sectional diagram taken along line C-C of FIG. 4.

Figure 6:
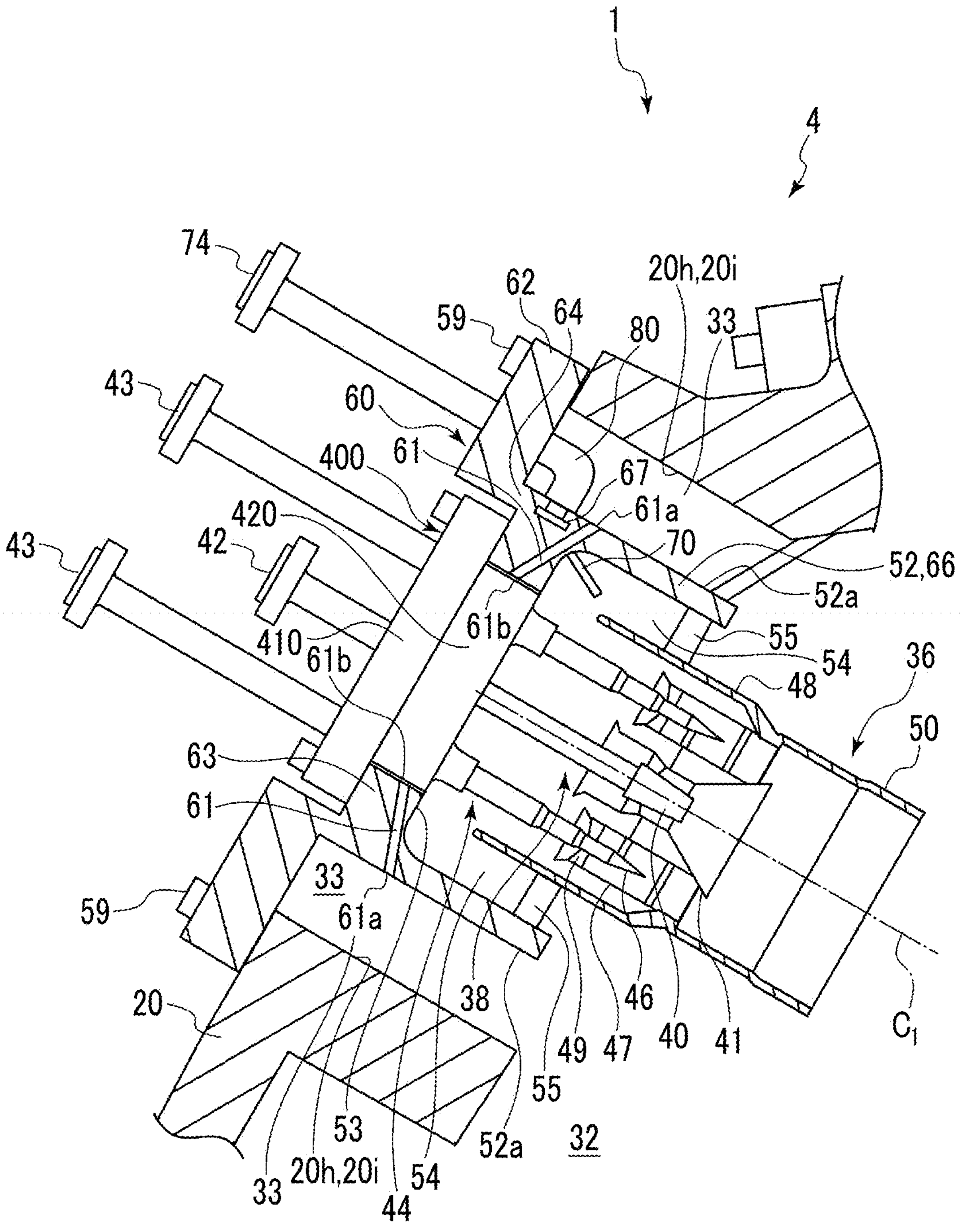
FIG. 6 is a schematic cross-sectional diagram of a combustor of a gas turbine according to another embodiment.

FIG. 6 is a schematic cross-sectional diagram of the combustor 4 of the gas turbine 1 according to another embodiment.

Figure 7:
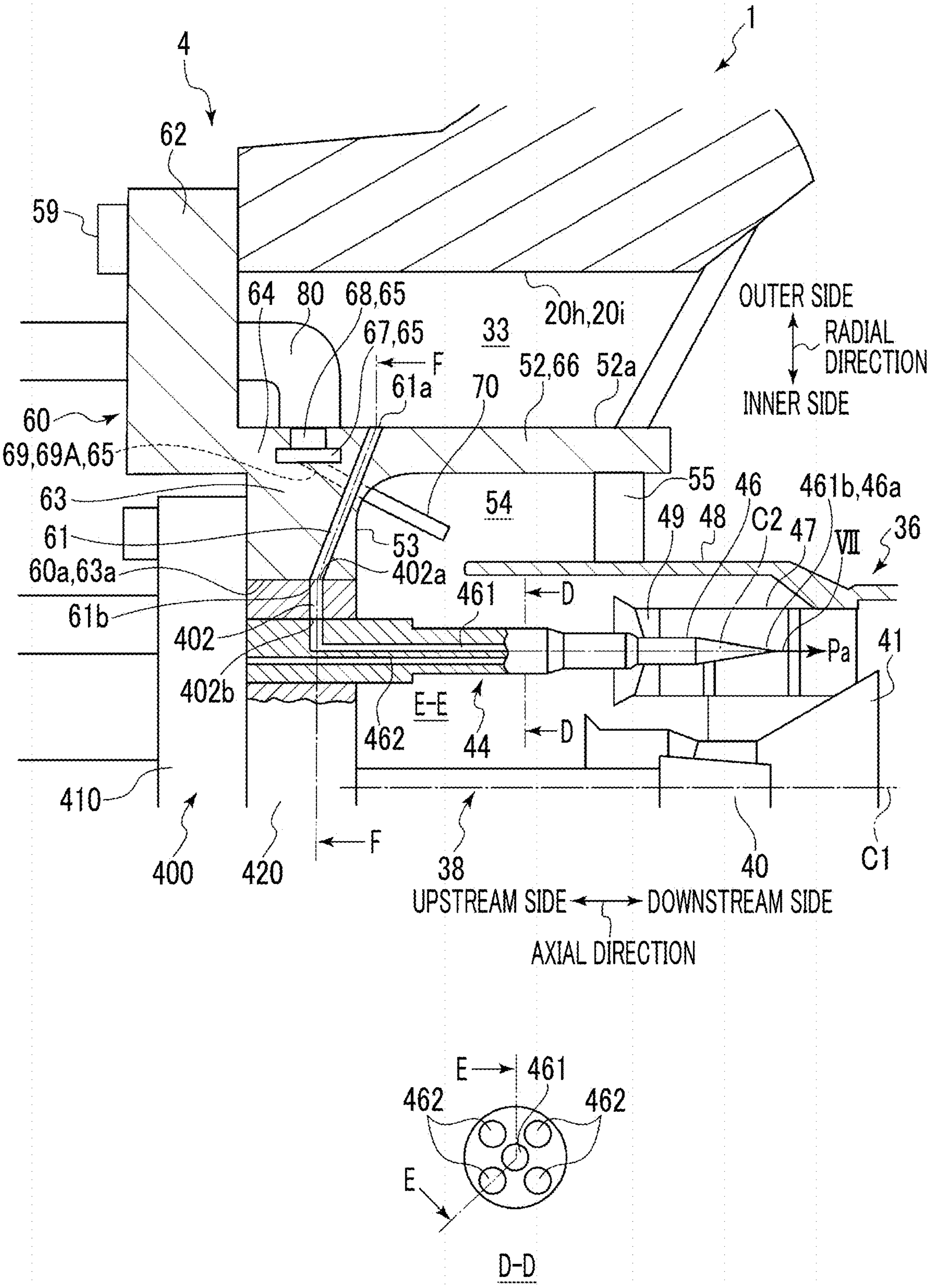
FIG. 7 is a schematic cross-sectional diagram of a main part of the combustor of the gas turbine according to another embodiment.

FIG. 7 is a schematic cross-sectional diagram of a main part of the combustor 4 of the gas turbine 1 according to another embodiment.

Figure 8:
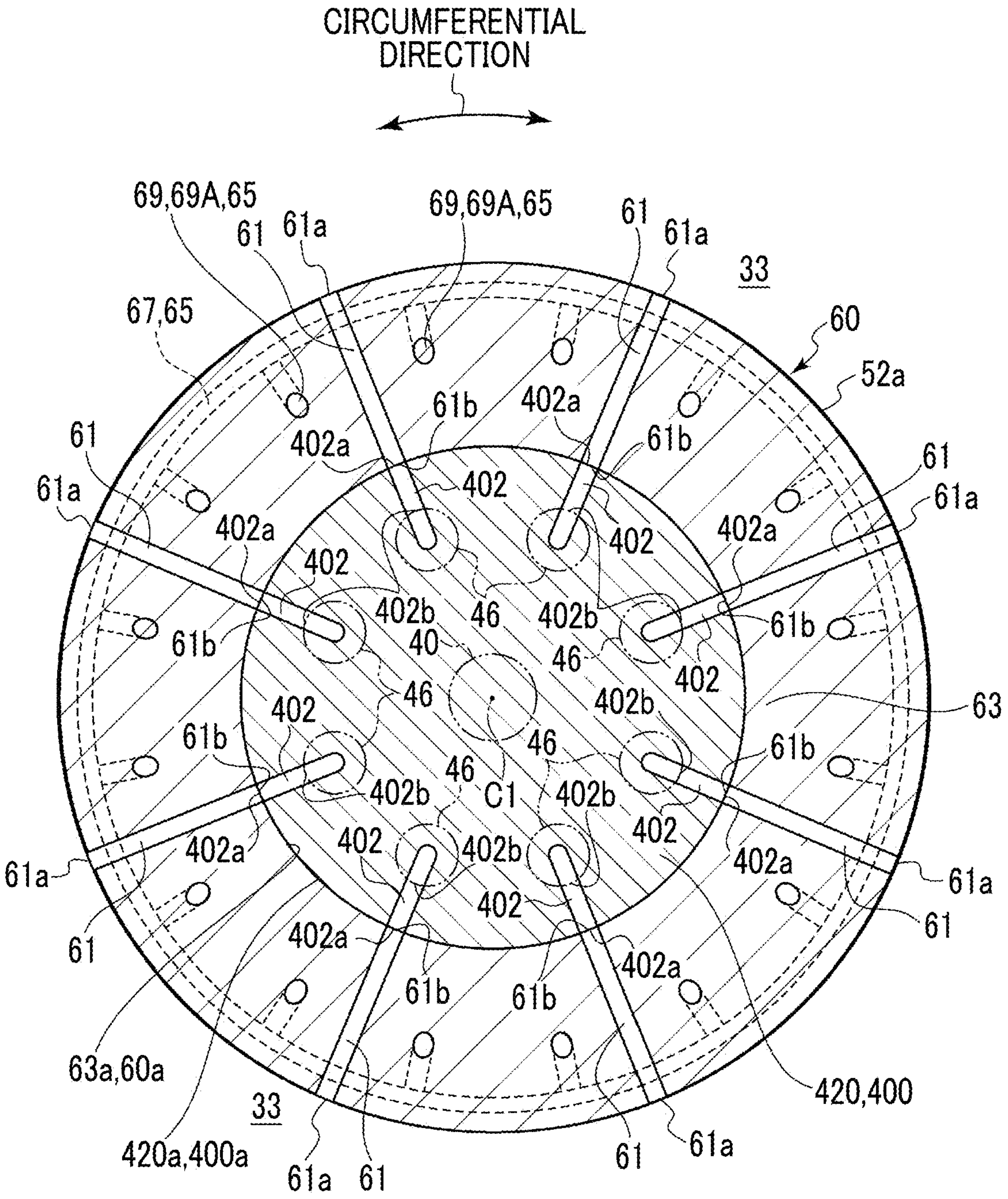
FIG. 8 is a schematic cross-sectional diagram taken along line F-F of FIG. 7.

FIG. 8 is a schematic cross-sectional diagram taken along line F-F of FIG. 7.

As shown in FIGS. 2, 3A, 3B, and 6, in the gas turbine 1 according to some embodiments, each of the plurality of combustors 4 (refer to FIG. 1) disposed in the circumferential direction with the rotor 8 as a center includes a combustion cylinder (combustor liner) 36 provided in a combustor casing 32 defined by the casing 20, and a first combustion burner 38 and a plurality of second combustion burners 44 disposed to d the first combustion burner 38, each of which being disposed in the combustion cylinder 36. That is, the combustion cylinder 36, the first combustion burner 38, and the second combustion burner 44 are accommodated in the casing 20.

The combustion cylinder (combustor liner) 36 has an inner cylinder 48 disposed around the first combustion burner 38 and the plurality of second combustion burners 44, and a transition piece 50 connected to a tip part of the inner cylinder 48. The inner cylinder 48 and the transition piece 50 may be integrally formed.

The first combustion burner 38 is disposed along a direction of a central axis C1 of the combustion cylinder 36 (that is, axial direction of combustor 4; hereinafter, simply referred to as "axial direction"), and has a first fuel nozzle 40 for jetting fuel, and a first burner cylinder 41 disposed to surround the first fuel nozzle 40. Fuel is supplied to the first fuel nozzle 40 via a first fuel port 42.

The second combustion burner 44 has a second fuel nozzle 46 for jetting fuel and a second burner cylinder 47 disposed to surround the second fuel nozzle 46. Fuel is supplied to the second fuel nozzle 46 via a second fuel port 43.

The combustor 4 according to some embodiments includes a nozzle fixing part 400. The first fuel nozzle 40 and the second fuel nozzle 46 are fixed to the nozzle fixing part 400 at base end parts of the first fuel nozzle 40 and the second fuel nozzle 46.

The combustor 4 further includes an outer cylinder 52 provided on an outer peripheral side of the inner cylinder 48 inside the casing 20. An air passage 54 through which compressed air flows is formed on an outer peripheral side of the inner cylinder 48 and an inner peripheral side of the outer cylinder 52.

The compressed air generated by the compressor 2 (refer to FIG. 1) is supplied into the combustor casing 32 via a casing inlet 31, and the compressed air flows into the air passage 54 from the combustor casing 32 as combustion air, is turned in direction by a wall surface part 53 provided along a surface orthogonal to the axial direction of the combustor 4, and flows into the first burner cylinder 41 and the second burner cylinder 47. Then, in each burner cylinder, the fuel jetted from the fuel nozzle and the compressed air (combustion air) are mixed, and the mixed gas flows into the combustion cylinder 36, and is ignited and combusted, so that the combustion gas is generated.

The above-described first combustion burner 38 may be a burner for generating a diffusion combustion flame, and the second combustion burner 44 may be a burner for combusting premixed gas to generate a premixed combustion flame.

That is, in the second combustion burner 44, the fuel from the second fuel port 43 and the compressed air are premixed, and the premixed gas mainly forms a swirling flow by means of a swirler 49 and flows into the combustion cylinder 36. In addition, the compressed air and the fuel jetted from the first combustion burner 38 via the first fuel port 42 are mixed in the combustion cylinder 36, and are ignited and combusted by ignition means (not shown) to generate combustion gas. At this time, a part of the combustion gas diffuses to surroundings with a flame, so that the premixed gas flowing into the combustion cylinder 36 from each of the second combustion burners 44 is ignited and combusted. That is, flame stabilization for performing stable combustion of the premixed gas (premixed fuel) from the second combustion burner 44 can be performed by a diffusion combustion flame caused by the fuel jetted from the first combustion burner 38.

In this way, the combustion gas generated by the combustion of the fuel in the combustor 4 flows into the turbine 6 via an outlet part 51 of the combustor 4 located at a downstream end part of the transition piece 50.

The combustor 4 includes a third fuel nozzle 70 for jetting fuel into the above-described air passage 54. A plurality of third fuel nozzles 70 may be provided along the circumferential direction. The third fuel nozzle 70 is fixed to a top hat body 60 to be described later.

When the fuel is jetted from the third fuel nozzle 70 into the air passage 54, the compressed air flowing into the air passage 54 and the jetted fuel are mixed, and the fuel-air mixture flows into each burner cylinder. Then, the fuel is jetted from the first fuel nozzle 40 and the second fuel nozzle 46 into the fuel-air mixture as described above to form the mixed gas, so that a uniform fuel-air mixture can be formed and a low NOx conversion can be achieved.

The combustor 4 may include other components such as a bypass pipe (not shown) for bypassing the combustion gas.

In the combustor 4 according to some embodiments, a straightening plate 55 is disposed in the air passage 54. The straightening plate 55 is a porous plate provided between the inner cylinder 48 and the outer cylinder 52 and fixedly disposed in an outer peripheral part of the inner cylinder 48, and a plurality of through-holes penetrating the straightening plate 55 are disposed.

The straightening plate 55 straightens a flow of the compressed air and generates a pressure loss when the compressed air passes through the straightening plate 55. That is, pressure is lower in the air passage 54, in which the compressed air that has passed through the straightening plate 55 flows, than that in the combustor casing 32 (refer to FIG. 2) and that in a void 33 to be described later.

Hereinafter, the combustor 4 according to some embodiments will be described in more detail.

(Top Hat Body 60)

As shown in FIGS. 3A, 3B, 4, 6, and 7, the combustor 4 according to some embodiments includes a flange part 62 attached to the casing 20, an annular extension part 64 extending along the axial direction of the combustor 4 from the flange part 62, and a pipe part 80 extending between the flange part 62 and the extension part 64. The fuel from a third fuel port 74 is supplied to the third fuel nozzle 70 via a passage 65 to be described later formed inside the pipe part 80 and the extension part 64. The third fuel nozzle 70 is provided on an inner peripheral side of the extension part 64.

In the combustor 4 according to some embodiments, a portion configured by the flange part 62 and the extension part 64 may be called the top hat body 60 due to the shape.

The top hat body 60 according to some embodiments is a bottomed cylindrical member provided to close a combustor insertion hole 20*h* formed in the casing 20.

As shown in FIGS. 3A, 3B, 4, 6, and 7, the flange part 62 has a shape protruding toward and an outside in a radial direction of the combustor 4 (hereinafter, simply referred to as "radial direction"), and is fixed to the casing 20 by a bolt 59.

The extension part 64 has a cylindrical shape extending along the axial direction of the combustor 4 from the flange part 62 toward an internal space of the casing 20. In some embodiments, the extension part 64 is located on a radial inner side with respect to the casing 20. In addition, the extension part 64 has an annular protrusion part 63 that protrudes toward the radial inner side. The wall surface part 53 that changes a direction of a compressed air flow flowing through the above-described air passage 54 is formed by the annular protrusion part 63.

As shown in FIGS. 3A, 3B, 4, 6, and 7, the air passage 54 may be at least partially formed by the extension part 64. That is, the extension part 64 may include an air passage forming part 66 (outer cylinder 52) that forms the air passage 54.

As shown in FIGS. 3A and 3B, in the gas turbine 1 according to one embodiment, in a region of the outer cylinder 52 in the circumferential direction, an outer peripheral surface 52*a* of the outer cylinder 52 is separated from an inner peripheral surface 20*i* of the combustor insertion hole 20*h* in a region relatively located on the radial outer side with the axis line O of the rotor 8 as a center. Accordingly, in the gas turbine 1 according to one embodiment, the void 33 through which the compressed air can flow is formed between the outer peripheral surface 52*a* of the outer cylinder 52 and the inner peripheral surface 20*i* of the combustor insertion hole 20*h* in the region relatively located on the radial outer side with the axis line O of the rotor 8 as a center.

As shown in FIG. 6, in the gas turbine 1 according to another embodiment, the outer peripheral surface 52*a* of the outer cylinder 52 is separated from the inner peripheral surface 20*i* of the combustor insertion hole 20*h* over the entire circumference. Accordingly, in the gas turbine 1 according to another embodiment, the void 33 through which the compressed air can flow is formed over the entire circumference of the outer peripheral surface 52*a* between the outer peripheral surface 52*a* of the outer cylinder 52 and the inner peripheral surface 20*i* of the combustor insertion hole 20*h*.

As shown in FIGS. 3A, 3B, 4, 6, and 7, a first internal flow path 61 through which the compressed air can be supplied from the space (void 33) on the outer peripheral side to the nozzle fixing part 400 is formed in an inside of the top hat body 60 according to some embodiments.

The first internal flow path 61 according to some embodiments has a first inlet 61*a* that is an inlet of the first internal flow path 61 and a first outlet 61*b* that is an outlet located on the radial inner side of the combustor 4 with respect to the first inlet 61*a*.

In the first internal flow path 61 according to some embodiments, the first inlet 61*a* is formed in the outer peripheral surface 52*a* of the outer cylinder 52.

In the first internal flow path 61 according to some embodiments, the first outlet 61*b* is formed in an inner peripheral part 60*a* of the top hat body 60 facing the nozzle fixing part 400, specifically, as shown in FIGS. 4 and 7, in an inner peripheral surface 63*a* of the annular protrusion part 63.

As shown in FIGS. 3A and 3B, in the combustor 4 according to one embodiment, the void 33 is not present on the relatively radial inner side with the axis line O of the rotor 8 as a center. A radial inner side with the axis line O of the rotor 8 as a center is a lower side as shown in FIG. 5. Therefore, in the combustor 4 according to one embodiment, as shown in FIG. 5, the first internal flow path 61 is provided on the radial outer side with the axis line O of the rotor 8 as a center, that is, on an upper side shown in FIG. 5, but is not provided on the lower side shown in FIG. 5.

As shown in FIG. 6, in the combustor 4 according to another embodiment, the void 33 is also present on the relatively radial inner side with the axis line O of the rotor 8 as a center. Therefore, in the combustor 4 according to another embodiment, as shown in FIG. 8, the first internal flow path 61 is provided not only on the upper side but also on the lower side as shown in FIG. 5.

At least a part of the first internal flow path 61 according to some embodiments is formed inside the extension part 64.

In the gas turbine 1 according to one embodiment shown in FIGS. 3A and 3B, for example, as shown in FIG. 5, at least one first internal flow path 61, preferably a plurality, may be provided.

In the gas turbine 1 according to another embodiment shown in FIG. 6, the first internal flow path 61 may be provided for each of a plurality of second internal flow paths 402 to be described later, for example, as shown in FIGS. 7 and 8.

The passage 65 for passing the fuel is provided inside the extension part 64. The passage 65 includes an annular passage 67 formed along the circumferential direction of the combustor 4, and a first connection passage 68 and a second connection passage 69 that are connected to the annular passage 67.

The first connection passage 68 is provided between the internal flow path of the pipe part 80 and the annular passage 67, and the internal flow path of the pipe part 80 and the annular passage 67 communicate with each other via the first connection passage 68. The second connection passage 69 is provided between the annular passage 67 and the third fuel nozzle 70.

In a case where the plurality of third fuel nozzles 70 are provided in the combustor 4, the second connection passage 69 is provided for each of the plurality of third fuel nozzles 70.

In the following description, the second connection passage 69 is also referred to as a third internal flow path 69A.

The first internal flow path 61 according to some embodiments may intersect the third internal flow path 69A when viewed from the circumferential direction of the combustor 4. Therefore, for example, as shown in FIGS. 5 and 8, the first internal flow path 61 is formed at a position different from that of the third internal flow path 69A in the circumferential direction to not interfere with the third internal flow path 69A.

In addition, in FIGS. 5 and 8, the description of the fuel flow path for supplying the fuel to the first fuel nozzle 40 and the second fuel nozzle 46 and of the first connection passage 68 is not shown.

(Nozzle Fixing Part 400)

As shown in FIGS. 3A, 3B, 4, 6, and 7, in the combustor 4 according to some embodiments, the nozzle fixing part 400 includes, for example, a flange part 410 attached to the annular protrusion part 63 of the top hat body 60, and a columnar main body part 420 extending from the flange part 410 along the axial direction of the combustor 4. The main body part 420 is inserted into the inner peripheral surface 63*a* of the annular protrusion part 63 of the top hat body 60.

In the combustor 4 according to some embodiments, the nozzle fixing part 400 includes a second internal flow path 402 through which the compressed air supplied from the first internal flow path 61 can be supplied to a purge air flow path 461 to be described later of the second fuel nozzle 46.

In the combustor 4 according to some embodiments, the second internal flow path 402 is provided corresponding to each of a plurality of second fuel nozzles 46.

The second internal flow path 402 according to some embodiments has a second inlet 402*a* that is an inlet of the second internal flow path 402 and a second outlet 402*b* that is an outlet connected to the purge air flow path 461 of the second fuel nozzle 46.

In the second internal flow path 402 according to some embodiments, the second inlet 402*a* is formed in an outer peripheral part 400*a* of the nozzle fixing part 400 facing the top hat body 60, specifically, in an outer peripheral surface 420*a* of the main body part 420.

In the second internal flow path 402 according to some embodiments, the second outlet 402*b* is connected to an inlet 461*a* of the purge air flow path 461 to be described later of the second fuel nozzle 46.

(Cavity)

As shown in FIGS. 4 and 5, in the combustor 4 according to one embodiment, the top hat body 60 and the nozzle fixing part 400 define a cavity 500 extending in the circumferential direction between the top hat body 60 and the nozzle fixing part 400.

More specifically, the cavity 500 is formed between the inner peripheral surface 63*a* of the annular protrusion part 63 of the top hat body 60 and the outer peripheral surface 420*a* of the main body part 420 of the nozzle fixing part 400.

As shown in FIGS. 4 and 5, in the combustor 4 according to one embodiment, the cavity 500 includes a downstream side region 510 on an axial downstream side and an upstream side region 520 on an axial upstream side.

In the combustor 4 according to one embodiment, the flow path cross-sectional area of the downstream side region 510 when viewed from the axial direction is smaller than the flow path cross-sectional area of the upstream side region 520.

That is, in the combustor 4 according to one embodiment, a height of the cavity 500 in the radial direction is smaller in the downstream side region 510 than in the upstream side region 520.

In the combustor 4 according to one embodiment, the first internal flow path 61 is in fluid communication with the cavity 500. More specifically, in the combustor 4 according to one embodiment, the first outlet 61*b* of the first internal flow path 61 is open to the inner peripheral surface 63*a* of the annular protrusion part 63 that defines the downstream side region 510 of the cavity 500.

In the combustor 4 according to one embodiment, the second internal flow path 402 is in fluid communication with the cavity 500. More specifically, in the combustor 4 according to one embodiment, the second inlet 402*a* of the second internal flow path 402 is open to the outer peripheral surface 420*a* of the main body part 420 defining the downstream side region 510 of the cavity 500.

That is, in the combustor 4 according to one embodiment, the first internal flow path 61 and the second internal flow path 402 are in fluid communication with each other via the cavity 500.

As shown in FIG. 7, in the combustor 4 according to another embodiment, the cavity 500 may not be provided. In this case, in the combustor 4 according to another embodiment, the first outlet 61*b* of the first internal flow path 61 may be directly connected to the second inlet 402*a* of the second internal flow path 402.

(Second Fuel Nozzle 46)

In the combustor 4 according to some embodiments, the second fuel nozzle 46 has an approximately cylindrical shape, and the purge air flow path 461 and a fuel flow path 462 are formed inside the second fuel nozzle 46.

As shown in FIGS. 4 and 7, in the second fuel nozzle 46 according to some embodiments, the purge air flow path 461 extends along a central axis C2 of the second fuel nozzle 46 in the second fuel nozzle 46. An outlet 461*b* of the purge air flow path 461 is formed in a tip 46*a* of the second fuel nozzle 46.

The central axis C2 of the second fuel nozzle 46 is parallel to the central axis C1 of the combustion cylinder 36.

(Regarding Jetting of Purge Air)

In the combustor 4 according to some embodiments configured as described above, the compressed air generated by the compressor 2 (refer to FIG. 1) is supplied into the combustor casing 32 via the casing inlet 31 and is supplied to the first combustion burner 38 and the second combustion burner 44 as the combustion air as described above during an operation of the gas turbine 1.

In addition, in the gas turbine 1 according to one embodiment shown in FIG. 4, the compressed air supplied into the combustor casing 32 is supplied to the cavity 500 from the above-described void 33 via the first internal flow path 61. The compressed air supplied to the cavity 500 is distributed to each of the second internal flow paths 402 and flows into the purge air flow path 461 of each of the second fuel nozzles 46. As indicated by an arrow IV in FIG. 4, the compressed air flowing into the purge air flow path 461 is jetted into the combustion cylinder 36 as purge air Pa from the outlet 461*b* of the purge air flow path 461.

In the gas turbine 1 according to another embodiment shown in FIG. 7, the compressed air supplied into the combustor casing 32 flows into the purge air flow path 461 of each second fuel nozzle 46 from the above-described void 33 via each first internal flow path 61 and each second internal flow path 402. As indicated by an arrow VII in FIG. 7, the compressed air flowing into the purge air flow path 461 is jetted into the combustion cylinder 36 as the purge air Pa from the outlet 461*b* of the purge air flow path 461.

(Regarding Flashback)

In the combustor 4 according to some embodiments, since the swirler 49 is provided in the second combustion burner 44, the premixed combustion flame generated by the second combustion burner 44 includes swirling flow component. That is, the premixed combustion flame propagates while swirling around the second fuel nozzle 46 as a center from one side to another side in the axial direction of the combustor 4. Therefore, a vortex core of a swirling flow is formed on the other side in the axial direction of the combustor 4 of the tip of the second fuel nozzle 46. In the vortex core, a flow speed and pressure are lower than in other regions, and thus it is known that flashback is likely to occur. Flashback is a phenomenon in which abnormal combustion occurs due to a propagation of a flame to a fuel that is staying in an unexpected region in the combustor 4.

In the combustor 4 according to some embodiments, as described above, the purge air Pa is jetted into the combustion cylinder 36 from the outlet 461*b* of the purge air flow path 461 formed in the tip 46*a* of the second fuel nozzle 46. Therefore, the flow speed and the pressure of the fluid in the vortex core can be increased. As a result, the above-described flashback can be suppressed.

The combustor 4 according to some embodiments is the combustor 4 that combusts the compressed air supplied from the compressor 2 together with the fuel. The combustor 4 according to at least one embodiment of the present disclosure includes the second fuel nozzle 46 that is at least one fuel nozzle having the fuel flow path 462 for supplying fuel and the purge air flow path 461 for jetting the purge air Pa. The combustor 4 according to at least one embodiment of the present disclosure includes the nozzle fixing part 400 for fixing the second fuel nozzle 46 that is at least one fuel nozzle. The combustor 4 according to at least one embodiment of the present disclosure includes the top hat body 60 disposed on at least a part of an outer peripheral side of the nozzle fixing part 400.

In the combustor 4 according to some embodiments, as described above, the top hat body 60 has the first internal flow path 61 capable of supplying the compressed air to the nozzle fixing part 400 from a space on the outer peripheral side, which is the void 33. The nozzle fixing part 400 has the second internal flow path 402 capable of supplying the compressed air supplied from the first internal flow path 61 to the purge air flow path 461 of the second fuel nozzle 46, which is the fuel nozzle.

Accordingly, the compressed air having a relatively small pressure loss supplied from the compressor 2 can be supplied to the second fuel nozzle 46, which is the fuel nozzle, as the purge air Pa without passing through the straightening plate 55.

In addition, in the combustor 4 according to some embodiments, the compressed air supplied as the purge air Pa can be supplied to the purge air flow path 461 of the second fuel nozzle 46, which is the fuel nozzle, without passing through the flow path traversing outside the combustor 4.

Accordingly, the compressed air can be supplied to the second fuel nozzle 46, which is the fuel nozzle, as the purge air Pa with a heat loss suppressed. Therefore, in the gas turbine 1 including the combustor 4 according to some embodiments, the heat loss can be suppressed.

The gas turbine 1 according to some embodiments includes the compressor 2, the combustor 4 according to some embodiments, and the turbine 6 configured to be driven by the combustion gas from the combustor 4.

Accordingly, the heat loss in the gas turbine 1 can be suppressed.

In the combustor 4 according to some embodiments, as described above, the first outlet 61*b* may be formed in the inner peripheral part 60*a* of the top hat body 60 facing the nozzle fixing part 400.

Accordingly, a place where the first outlet 61*b* is formed is reasonable for fluid communication between the first internal flow path 61 formed in the top hat body 60 and the second internal flow path 402 formed in the nozzle fixing part 400.

In the combustor 4 according to some embodiments, as described above, the second inlet 402*a* may be formed in the outer peripheral part 400*a* of the nozzle fixing part 400 facing the top hat body 60.

Accordingly, a place where a second inlet 402*a* is formed is reasonable for fluid communication between the first internal flow path 61 formed in the top hat body 60 and the second internal flow path 402 formed in the nozzle fixing part 400.

In the combustor 4 according to one embodiment, as described above, the top hat body 60 and the nozzle fixing part 400 may define the cavity 500 extending in the circumferential direction between the top hat body 60 and the nozzle fixing part 400. The nozzle fixing part 400 may include the plurality of second internal flow paths 402 that fix the plurality of fuel nozzles (second fuel nozzles 46) in the circumferential direction and that are capable of supplying compressed air to the plurality of fuel nozzles (second fuel nozzles 46). The plurality of second internal flow paths 402 may be in fluid communication with the cavity 500 extending in the circumferential direction.

By forming the cavity 500 extending in the circumferential direction, the first internal flow path 61 of the top hat body 60 and the plurality of second internal flow paths 402 of the nozzle fixing part 400 can be in fluid communication. For this reason, the pressure of the purge air Pa injected from the plurality of fuel nozzles (second fuel nozzles 46) can be aligned to a close value. Therefore, a variation in a flow rate of the purge air Pa injected from the plurality of fuel nozzles (second fuel nozzles 46) can be suppressed.

In the combustor 4 according to one embodiment, the second inlet 402*a* may be provided at a position different from that of the first outlet 61*b* when viewed from the radial direction of the combustor 4.

In the cavity 500, the second inlet 402*a* that is an inlet of the second internal flow path 402 is provided at a position separated from the first outlet 61*b* that is an outlet of the first internal flow path 61. As a result, the pressure of the purge air Pa injected from the plurality of fuel nozzles (second fuel nozzles 46) can be aligned to a close value. Accordingly, the variation in the flow rate of the purge air Pa injected from the plurality of fuel nozzles (second fuel nozzles 46) can be suppressed.

In the combustor 4 according to one embodiment, the second inlet 402*a* may be provided at a position different from that of the first outlet 61*b* in at least one of the axial direction or the circumferential direction of the combustor 4.

In addition, in an example shown in FIG. 4, the second inlet 402*a* is provided on the axial downstream side of the combustor 4 with respect to the first outlet 61*b*. However, the second inlet 402*a* may be provided on the axial upstream side of the combustor 4 with respect to the first outlet 61*b*. That is, in the combustor 4 according to one embodiment, the second inlet 402*a* may be provided on the axial upstream side with respect to the example shown in FIG. 4, and the first outlet 61*b* may be provided on the axial downstream side with respect to the example shown in FIG. 4.

In the combustor 4 according to one embodiment, the flow path cross-sectional area of the cavity 500 at a downstream side end part 511 in the axial direction of the cavity 500 when viewed from the axial direction of the combustor 4 may be smaller than the flow path cross-sectional area of the cavity 500 at a position of the second inlet 402*a* in the axial direction.

Accordingly, it is possible to suppress an entry of the fuel or the like jetted from the third fuel nozzle 70 into the cavity 500 from the axial downstream side.

In the combustor 4 according to one embodiment, the compressed air in the cavity 500 is configured to be jetted from the downstream side end part 511 to the air passage 54 via the downstream side region 510. Therefore, the entry of the fuel or the like jetted from the third fuel nozzle 70 into the cavity 500 from the axial downstream side is further suppressed.

In the combustor 4 according to one embodiment, the height of the cavity 500 in the radial direction in the downstream side region 510 may be zero, that is, a gap between the inner peripheral surface 63*a* of the annular protrusion part 63 of the top hat body 60 and the outer peripheral surface 420*a* of the main body part 420 of the nozzle fixing part 400 may not essentially exist in the downstream side region 510.

In the combustor 4 according to another embodiment, the second internal flow path 402 may be connected to a first internal flow path 401 in a one-to-one manner.

Accordingly, the cavity 500 may not be provided.

In the combustor 4 according to some embodiments, as described above, the top hat body 60 may have the third internal flow path 69A for supplying the fuel to the third fuel nozzle 70 that is the flow path jetting nozzle fixed to the top hat body 60. The first internal flow path 61 may intersect the third internal flow path 69A when viewed from the circumferential direction of the combustor 4.

Accordingly, the first internal flow path 61 can be disposed in the top hat body 60 without any problem.

The present disclosure is not limited to the above-described embodiments, and also includes a form in which modifications are added to the above-described embodiments or a form in which the embodiments are combined as appropriate.

For example, contents described in each of the above-described embodiments are understood as follows.

(1) The combustor 4 according to at least one embodiment of the present disclosure is the combustor 4 that combusts the compressed air supplied from the compressor 2 together with the fuel. The combustor 4 according to at least one embodiment of the present disclosure includes the second fuel nozzle 46 that is at least one fuel nozzle having the fuel flow path 462 for supplying fuel and the purge air flow path 461 for jetting the purge air Pa. The combustor 4 according to at least one embodiment of the present disclosure includes the nozzle fixing part 400 for fixing the second fuel nozzle 46 that is at least one fuel nozzle. The combustor 4 according to at least one embodiment of the present disclosure includes the top hat body 60 disposed on at least a part of an outer peripheral side of the nozzle fixing part 400. The top hat body 60 has the first internal flow path 61 capable of supplying compressed air to the nozzle fixing part 400 from the space on the outer peripheral side, which is the void 33. The nozzle fixing part 400 has the second internal flow path 402 capable of supplying the compressed air supplied from the first internal flow path 61 to the purge air flow path 461 of the second fuel nozzle 46, which is the fuel nozzle.

According to the above-described configuration of (1), the compressed air having a relatively small pressure loss supplied from the compressor 2 can be supplied to the second fuel nozzle 46, which is the fuel nozzle, as the purge air Pa with the heat loss suppressed. Accordingly, in the gas turbine 1 including the combustor 4 having the above-described configuration of (1), the heat loss can be suppressed.

(2) In some embodiments, in the above-described configuration of (1), the first internal flow path 61 may have the first inlet 61*a* that is an inlet of the first internal flow path 61 and the first outlet 61*b* that is an outlet located on the radial inner side of the combustor 4 with respect to the first inlet 61*a*. The first outlet 61*b* may be formed in the inner peripheral part 60*a* of the top hat body 60 that faces the nozzle fixing part 400.

According to the above-described configuration of (2), the place where the first outlet 61*b* is formed is reasonable for fluid communication between the first internal flow path 61 formed in the top hat body 60 and the second internal flow path 402 formed in the nozzle fixing part 400.

(3) In some embodiments, in the above-described configuration of (1) or (2), the second internal flow path 402 may have the second inlet 402*a* that is an inlet of the second internal flow path 402 and the second outlet 402*b* that is an outlet connected to the purge air flow path 461 of the fuel nozzle (second fuel nozzle 46). The second inlet 402*a* may be formed in the outer peripheral part 400*a* of the nozzle fixing part 400 that faces the top hat body 60.

According to the above-described configuration of (3), a place where the second inlet 402*a* is formed is reasonable for fluid communication between the first internal flow path 61 formed in the top hat body 60 and the second internal flow path 402 formed in the nozzle fixing part 400.

(4) In some embodiments, in any one of the above-described configurations of (1) to (3), the top hat body 60 and the nozzle fixing part 400 may define the cavity 500 extending in the circumferential direction between the top hat body 60 and the nozzle fixing part 400. The nozzle fixing part 400 may include the plurality of second internal flow paths 402 that fix the plurality of fuel nozzles (second fuel nozzles 46) in the circumferential direction and that are capable of supplying compressed air to the plurality of fuel nozzles (second fuel nozzles 46). The plurality of second internal flow paths 402 may be in fluid communication with the cavity 500 extending in the circumferential direction.

According to the above-described configuration of (4), the cavity 500 extending in the circumferential direction is formed, so that the first internal flow path 61 of the top hat body 60 and the plurality of second internal flow paths 402 of the nozzle fixing part 400 can be in fluid communication. For this reason, the pressure of the purge air Pa injected from the plurality of fuel nozzles (second fuel nozzles 46) can be aligned to a close value. Therefore, a variation in a flow rate of the purge air Pa injected from the plurality of fuel nozzles (second fuel nozzles 46) can be suppressed.

(5) In some embodiments, in the above-described configuration of (4), the first internal flow path 61 may have the first inlet 61*a* that is an inlet of the first internal flow path and the first outlet 61*b* that is an outlet located on the radial inner side of the combustor 4 with respect to the first inlet 61*a*. The second internal flow path 402 may have the second inlet 402*a* that is an inlet of the second internal flow path 402 and the second outlet 402*b* that is an outlet connected to the purge air flow path 461 of the fuel nozzle (second fuel nozzle 46). The second inlet 402*a* may be provided at a position different from the first outlet 61*b* when viewed from the radial direction of the combustor 4.

According to the above-described configuration of (5), the second inlet 402*a* that is an inlet of the second internal flow path 402 is provided at a position separated from the first outlet 61*b* that is an outlet of the first internal flow path 61 in the cavity 500. As a result, the pressure of the purge air Pa injected from the plurality of fuel nozzles (second fuel nozzles 46) can be aligned to a close value. Accordingly, the variation in the flow rate of the purge air Pa injected from the plurality of fuel nozzles (second fuel nozzles 46) can be suppressed.

(6) In some embodiments, in the above-described configuration of (4) or (5), the second internal flow path 402 may have the second inlet 402*a* that is an inlet of the second internal flow path 402 and the second outlet 402*b* that is an outlet connected to the purge air flow path 461 of the fuel nozzle (second fuel nozzle 46). The flow path cross-sectional area of the cavity 500 at the downstream side end part 511 in the axial direction of the cavity 500 when viewed from the axial direction of the combustor 4 may be smaller than the flow path cross-sectional area of the cavity 500 at the position of the second inlet 402*a* in the axial direction.

According to the above-described configuration of (6), it is possible to suppress the entry of the fuel or the like into the cavity 500 from the downstream side of the cavity 500.

(7) In some embodiments, in any one of the above-described configurations of (1) to (3), the second internal flow path 402 may be connected to the first internal flow path 61 in a one-to-one manner.

According to the above-described configuration of (7), the cavity 500 may not be provided.

(8) In some embodiments, in any one of the above-described configurations of (1) to (7), the top hat body 60 may have the third internal flow path 69A for supplying the fuel to the third fuel nozzle 70 that is a flow path jetting nozzle fixed to the top hat body 60. The first internal flow path 61 may intersect the third internal flow path 69A when viewed from the circumferential direction of the combustor 4.

According to the above-described configuration of (8), the first internal flow path 61 can be disposed in the top hat body 60 without any problem.

(9) The gas turbine 1 according to at least one embodiment of the present disclosure includes the compressor 2, the combustor 4 having any one of the above-described configurations of (1) to (8), and the turbine 6 configured to be driven by the combustion gas from the combustor 4.

According to the above-described configuration of (9), the combustor 4 having the above-described configuration of (1) is provided. Therefore, a heat loss in the gas turbine 1 can be suppressed.

REFERENCE SIGNS LIST

1: gas turbine
2: compressor
4: combustor
6: turbine
38: first combustion burner
40: first fuel nozzle
44: second combustion burner
46: second fuel nozzle
60: top hat body
61: first internal flow path
61*a*: first inlet
61*b*: first outlet
69: second connection passage
69A: third internal flow path
70: third fuel nozzle
400: nozzle fixing part
402: second internal flow path
402*a*: second inlet
402*b*: second outlet
500: cavity

The invention claimed is:

1. A combustor that combusts compressed air supplied from a compressor together with fuel, the combustor comprising:

at least one fuel nozzle that has a substantially cylindrical nozzle body, a fuel flow path for supplying the fuel, and a purge air flow path for jetting purge air, the purge air flow path extending along an interior of the nozzle body along a central axis of the nozzle body and having an outlet formed at a tip of the nozzle body;

a nozzle fixing part for fixing the at least one fuel nozzle; and a top hat body that surrounds an outer circumference of the nozzle body and that is disposed on an outer peripheral side of at least a part of the nozzle fixing part, wherein the top hat body has a first internal flow path through which the compressed air is supplied from a space on the outer peripheral side to the nozzle fixing part, and the nozzle fixing part has a second internal flow path through which the compressed air supplied from the first internal flow path is supplied to the purge air flow path of the at least one fuel nozzle.

2. The combustor according to claim 1, wherein the first internal flow path has a first inlet that is an inlet of the first internal flow path and a first outlet that is an outlet located on a radial inner side of the combustor with respect to the first inlet, and the first outlet is formed in an inner peripheral part of the top hat body that faces the nozzle fixing part.

3. The combustor according to claim 1, wherein the second internal flow path has a second inlet that is an inlet of the second internal flow path and a second outlet that is an outlet connected to the purge air flow path of the at least one fuel nozzle, and the second inlet is formed in an outer peripheral part of the nozzle fixing part that faces the top hat body.

4. The combustor according to claim 1, wherein the second internal flow path is connected to the first internal flow path in a one-to-one manner.

5. The combustor according to claim 1, wherein the top hat body has a third internal flow path for supplying the fuel to a flow path jetting nozzle fixed to the top hat body, and the first internal flow path intersects the third internal flow path when viewed from a circumferential direction of the combustor.

6. A gas turbine comprising:

the compressor;

the combustor according to claim 1; and a turbine configured to be driven by combustion gas from the combustor.

7. The combustor according to claim 1, wherein the fuel flow path extends along the interior of the nozzle body.

8. A combustor that combusts compressed air supplied from a compressor together with fuel, the combustor comprising:

a plurality of fuel nozzles that each have a fuel flow path for supplying the fuel and a purge air flow path for jetting purge air;

a nozzle fixing part for fixing the plurality of fuel nozzles; and a top hat body that is disposed on an outer peripheral side of at least a part of the nozzle fixing part, wherein the top hat body has a first internal flow path through which the compressed air is supplied from a space on the outer peripheral side to the nozzle fixing part, the nozzle fixing part has a plurality of second internal flow paths through which the compressed air supplied from the first internal flow path is supplied to the purge air flow path of each of the plurality of fuel nozzles, wherein the top hat body and the nozzle fixing part define a cavity extending in a circumferential direction between the top hat body and the nozzle fixing part, the nozzle fixing part fixes the plurality of fuel nozzles in the circumferential direction, and the plurality of second internal flow paths are in fluid communication with the cavity extending in the circumferential direction.

9. The combustor according to claim 8, wherein the first internal flow path has a first inlet that is an inlet of the first internal flow path and a first outlet that is an outlet located on a radial inner side of the combustor with respect to the first inlet, each of the plurality of second internal flow paths has a second inlet that is an inlet of the second internal flow path and a second outlet that is an outlet connected to the purge air flow path of a respective one of the plurality of fuel nozzles, and the second inlet is provided at a position different from a position of the first outlet when viewed from a radial direction of the combustor.

10. The combustor according to claim 8, wherein each of the plurality of second internal flow paths has a second inlet that is an inlet of the second internal flow path and a second outlet that is an outlet connected to the purge air flow path of a respective one of the plurality of fuel nozzles, and a flow path cross-sectional area of the cavity at a downstream side end part in an axial direction of the cavity when viewed from the axial direction of the combustor is smaller than a flow path cross-sectional area of the cavity at a position of the second inlet in the axial direction.

11. The combustor according to claim 8, wherein the first internal flow path is one of a plurality of first internal flow paths formed in the top hat body, and the plurality of second internal flow paths are connected to the plurality of first internal flow paths in a one-to-one manner.

12. The combustor according to claim 8, wherein the top hat body has a third internal flow path for supplying the fuel to a flow path jetting nozzle fixed to the top hat body, and the first internal flow path intersects the third internal flow path when viewed from a circumferential direction of the combustor.

13. A gas turbine comprising:

the compressor;

the combustor according to claim 8; and a turbine configured to be driven by combustion gas from the combustor.

14. A combustor that combusts compressed air supplied from a compressor together with fuel, the combustor comprising:

a combustion cylinder;

at least one fuel nozzle that has a fuel flow path for supplying the fuel, and a purge air flow path for jetting purge air, the at least one fuel nozzle being disposed in the combustion cylinder such that a central axis of the at least one fuel nozzle is parallel to a central axis of the combustion cylinder, the purge air flow path extending along the central axis of the at least one fuel nozzle;

a nozzle fixing part for fixing the at least one fuel nozzle; and a top hat body that is disposed on an outer peripheral side of at least a part of the nozzle fixing part, wherein the top hat body has a first internal flow path through which the compressed air is supplied from a space on the outer peripheral side to the nozzle fixing part, and the nozzle fixing part has a second internal flow path through which the compressed air supplied from the first internal flow path is supplied to the purge air flow path of the at least one fuel nozzle.

15. The combustor according to claim 14, wherein the first internal flow path has a first inlet that is an inlet of the first internal flow path and a first outlet that is an outlet located on a radial inner side of the combustor with respect to the first inlet, and the first outlet is formed in an inner peripheral part of the top hat body that faces the nozzle fixing part.

16. The combustor according to claim 14, wherein the second internal flow path has a second inlet that is an inlet of the second internal flow path and a second outlet that is an outlet connected to the purge air flow path of the at least one fuel nozzle, and the second inlet is formed in an outer peripheral part of the nozzle fixing part that faces the top hat body.

17. The combustor according to claim 14, wherein the second internal flow path is connected to the first internal flow path in a one-to-one manner.

18. The combustor according to claim 14, wherein the top hat body has a third internal flow path for supplying the fuel to a flow path jetting nozzle fixed to the top hat body, and the first internal flow path intersects the third internal flow path when viewed from a circumferential direction of the combustor.

19. A gas turbine comprising:

the compressor;

the combustor according to claim 14; and a turbine configured to be driven by combustion gas from the combustor.

* * * * *